United States Patent [19]

Mader

[11] 4,231,327
[45] Nov. 4, 1980

[54] RELEASABLE ANIMAL HITCHING APPARATUS

[76] Inventor: William L. Mader, Ekalaka, Mont. 59324

[21] Appl. No.: 337

[22] Filed: Jan. 2, 1979

[51] Int. Cl.³ .......................... B68B 1/00; A01K 3/00
[52] U.S. Cl. .................................... 119/110; 280/193; 119/114; 119/123
[58] Field of Search ............... 119/109, 110, 111, 114, 119/123; 114/217, 252; 280/193; 9/44; 54/34

[56] References Cited

U.S. PATENT DOCUMENTS

| | | | |
|---|---|---|---|
| 73,432 | 1/1868 | Benham | 54/34 |
| 855,675 | 6/1907 | Skinner et al. | 54/34 |
| 937,800 | 10/1909 | Hazzard | 119/114 |
| 1,540,854 | 6/1925 | Mack | 280/193 |
| 1,786,314 | 12/1930 | Passmel | 280/193 |
| 2,573,771 | 11/1951 | Novak | 280/193 |
| 3,292,226 | 12/1966 | Foster | 119/114 |

*Primary Examiner*—Louis G. Mancene
*Assistant Examiner*—Robert P. Swiatek
*Attorney, Agent, or Firm*—Arthur L. Urban

[57] ABSTRACT

A releasable animal hitching apparatus including a support member, a hitching member movably carried by the support member, and a biasing member associated with the hitching member, the support member including a main section and transverse sections extending substantially perpendicularly from the main section adjacent the ends thereof, the main section including structure for fastening the support member to a supporting surface, each of the end sections having a recess therein facing the corresponding recess in the other end section, the hitching member including a hollow housing disposed between the recesses of the end sections, an opening in the sidewall of the housing, at least one bracket section extending outwardly from the external sidewall of the housing adjacent the opening thereof, a trigger member pivotally connected to the bracket section, the trigger member having a first portion extending through the sidewall opening of the housing, the first trigger portion having a rounded surface area extending toward the center of the housing and a stop member adjacent the internal sidewall surface of the housing, the trigger member having a second portion extending generally along and spaced from the external sidewall of the housing, the biasing member being disposed within the housing and extending between the internal first portion of the trigger member and the end of the housing remote therefrom.

10 Claims, 3 Drawing Figures

RELEASABLE ANIMAL HITCHING APPARATUS

This invention relates to a novel animal hitch and more particularly relates to a releasable animal hitching apparatus.

It often is necessary to restrain an animal in a desired position. This is particularly true when working with large farm animals such as horses and cattle. Ordinarily, this is done by placing a halter or bridle on the animal's head and tieing the lead or reins to a fixed object, e.g. a fence, post, wall or the like.

Frequently, the lead cannot be tied directly to the fixed object but must be secured to a connector such as a ring, wire loop or some makeshift connector that is attached to the fixed object. While such connectors may hold the lead or reins if the animal is restrained for only a few minutes, the animal may become restless and move around causing the lead to become entangled with the connector. This may cause the animal to become frightened and use his strength to break the lead.

The tieing of horses is a problem especially when a number of horses must be tied for a period of time such as at horse shows, rodeos, etc. In these situations, there are many strange sights and sounds which may frighten or spook the horses. Even if only one of the horses becomes sufficiently frightened to pull back and break his reins, when he is free, he is apt to run between other tied horses, scaring them and setting off a chain reaction resulting in a number of horses breaking loose and damaging their reins, bridles or other parts of their tack.

The present invention provides a novel animal hitching apparatus which substantially eliminates broken reins, bridles, leads, etc. The hitching apparatus of the invention is convenient to use. The hitching apparatus holds an animal securely under normal conditions but releases the animal before he becomes excited to the point that he can do damage and/or injure himself. This release of the animal is accomplished without breaking of the reins, bridle, lead, halter, etc. Furthermore, the hitching apparatus of the invention greatly reduces the possibility of tangling of the reins while the animal is hitched thereto.

The hitching apparatus of the present invention is simple in design and can be mounted for use easily. In addition, the hitching apparatus can be fabricated from commercially available materials utilizing known metal fabricating techniques. Also, the hitching apparatus can be manufactured in quantity relatively inexpensively.

Other benefits and advantages of the novel animal hitching apparatus will be apparent from the following description and the accompanying drawings in which.

Figure 1:
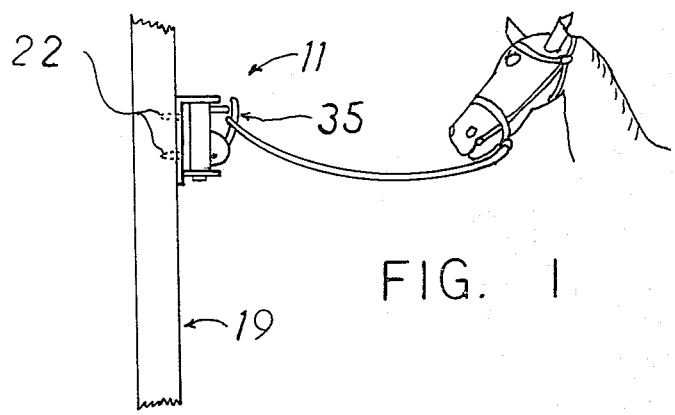
FIG. 1 is a view in perspective showing one form of the animal hitching apparatus of the invention in use.
Figure 2:
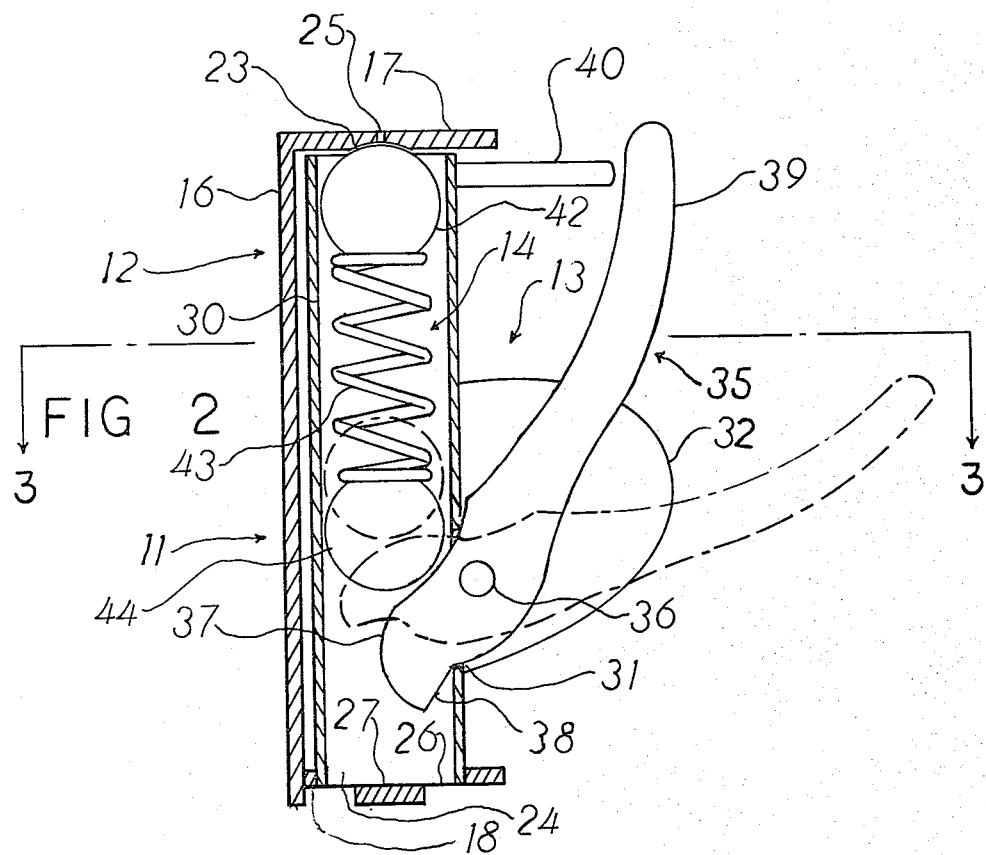
FIG. 2 is an enlarged sectional view of the hitching apparatus shown in FIG. 1.
Figure 3:
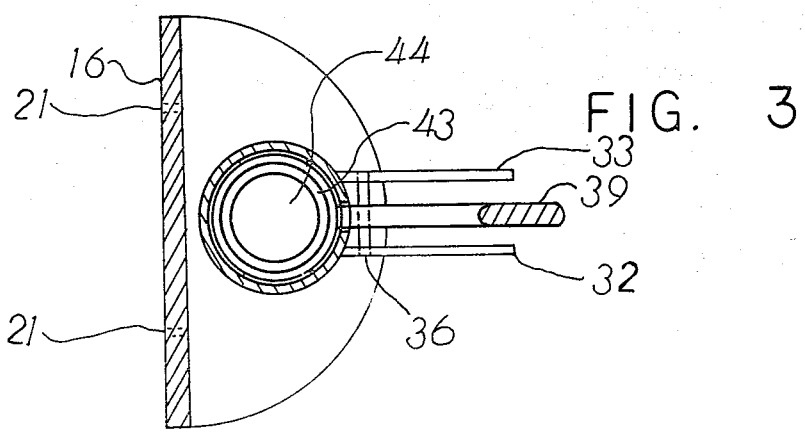
FIG. 3 is a sectional view of the hitching apparatus shown in FIG. 2 taken along line 3—3.

As shown in the drawings, one form of the novel animal hitching apparatus 11 of the present invention includes a support member 12, hitching means 13 movably carried by support member 12 and biasing means 14 associated with hitching means 13.

Support member 12 includes a main section 16 and transverse sections 17 and 18. Transverse sections 17 and 18 extend substantially perpendicularly from main section 16 adjacent the ends thereof. Advantageously, sections 16, 17 and 18 form a unitary U-shaped member.

Main section 16 has means for fastening the support member to a support surface 19 such as a wall, fence, post, trailer or the like. As shown, the fastening means include openings 21 in the main section 16. Suitable fasteners 22 such as screws, bolts, nails, etc. may be disposed through openings 21 to affix the hitching apparatus 11 to the supporting surface 19.

Each of the transverse end sections 17 and 18 has a recess 23 and 24, respectively. Each recess 23 and 24 faces the corresponding recess in the other end section. Advantageously, the recesses 23 and 24 each have an opening in the bottom thereof which opening extends through the respective end section. As shown, opening 25 is located in end section 17. The opening 26 in the end section 18 is formed by affixing a stop 27 to the bottom surface of the end section since the recess 24 extends completely through the section.

Hitching means 13 includes a hollow housing 30, preferably cylindrical in shape, which is disposed between the recesses 23 and 24 of end sections 17 and 18, respectively. As shown, the lower end of housing 30 is disposed within recess 24 and rests on strip 27. Hitching means 13 also includes an opening 31 in the sidewall of the housing 30. Opening 31, which advantageously is located adjacent the lower end of housing 30, provides a passage between the interior and the exterior of the housing. At least one bracket section and preferably two bracket sections shown as 32 and 33 extend outwardly from the external sidewall of housing 30 adjacent to opening 31.

Hitching means 13 includes a trigger member 35 which is pivotally connected to bracket sections 32 and 33 through a pin 36 extending therebetween. Trigger member 35 has a first portion 37 on one side of the pivotal connection with the bracket sections which extends through opening 31 into the interior of housing 30. The first trigger portion 37 has a rounded surface area extending toward the center of housing 30 and stop means adjacent the internal sidewall of the housing. Advantageously, the stop means includes a substantially flat surface 38 engageable with the internal sidewall.

Trigger member 35 has a second portion 39 extending generally along and spaced from external sidewall of housing 30. A rod portion 40 extends from the external sidewall of housing 30 adjacent the free end of the second trigger portion 39.

Biasing means are disposed within housing 30 and extend between the internal first portion 37 of trigger member 35 and the end of the housing remote from the first trigger portion. Advantageously, the biasing means includes a pivoting member shown as sphere 42 which is urged against recess 23 in section 17 remote from first trigger portion 37 by a coil spring 43. Preferably, a second sphere 44 also is positioned at the opposite end of spring 43 adjacent first trigger portion 37.

In the assembly of the novel releasable animal hitching apparatus of the invention, trigger member 35 is pivotally connected to bracket sections 32 and 33 of housing 30 with pin 36 to form hitching means 13. Trigger member 35 is positioned with the first portion 37 thereof extending into the interior of the housing 30 through opening 31. Next, sphere 44 is dropped into housing 30 and comes to rest against the internal portion 37 of the trigger member 35. Spring 43 is slid into the bore of housing 30 with one end against sphere 44. Then sphere 42 is placed on the upper end of the spring within the housing. The upper part of the sphere will extend beyond the top of the housing.

Thereafter, the lower end of housing 30 is inserted into recess 24 in end section 18 and the upper end of the housing pushed into alignment with recess 23. A slight depression of sphere 42 will cause it to slip into recess 23 and lock the assembly in position. The biasing contact of sphere 42 with recess 23 and the lower end of housing 30 with recess 24 and retaining strip 27 allows the hitching means 13 to pivot with respect to support member 12. Thus, mounting of the hitching apparatus of the invention on a fixed supporting surface 19 does not restrict the pivoting action of the hitching means 13.

In the use of the hitching apparatus of the invention, the apparatus is mounted on a fixed supporting surface 19 with fasteners 22 inserted through openings 21 of support member 12. Thereafter, the reins or lead of an animal are attached to the hitching apparatus by pulling the free end of trigger portion 39 away from rod portion 40. The reins are dropped into the space therebetween and the trigger member 35 allowed to return to its rest position. The reins rest against the top surface of bracket sections 32 and 33.

When the tied animal is frightened and pulls back on the reins, the force will overcome force of spring 43 and sphere 44 against first trigger portion 37 allowing the free end of the outside second trigger portion 39 to move away from rod portion 40. In this way, the reins can slide free allowing the animal to gain his freedom without breaking his reins. Since the animal has gained his freedom without struggling against the hitch excessively, the animal will not become excited to an excessive degree which would cause injury to himself or damage to his surroundings. Maintaining a space between the end of rod portion 40 and the free end of the second trigger portion 39 at rest prevents roughening of the surfaces which might otherwise occur if the surfaces struck each other when the trigger member was activated. The passage of reins over roughened surfaces repeatedly could cause damage to the reins which would be undesirable.

The above description and the drawings show that the present invention provides a novel animal hitching apparatus which substantially eliminates broken reins, bridles, leads, etc. The hitching apparatus of the invention holds an animal securely under normal conditions but releases the animal before he becomes excited to the point that he does damage and/or injures himself. The release of the animal is accomplished without breaking or damage to the reins or other parts of the tack. In addition, the hitching apparatus greatly reduces tangling of the reins while the animal is tied thereto.

The hitching apparatus of the invention is simple in design and convenient to use. Also, the hitching apparatus can be fabricated from commercially available materials utilizing known metal fabricating techniques. In addition, the hitching apparatus can be manufactured in quantity relatively inexpensively.

It will be apparent that various modifications can be made in the particular hitching apparatus described in detail above and shown in the drawings within the scope of the invention. For example, the size and configuration of the components can be changed to meet specific requirements. Also, means for fastening the apparatus to fixed supporting surfaces can be different. Therefore, the scope of the invention is to be limited only by the following claims.

What is claimed is:

1. A releasable animal hitching apparatus including a support member, hitching means movably carried by said support member, and biasing means associated with said hitching means, said support member including a main section and transverse sections extending substantially perpendicularly from said main section adjacent the ends thereof, said main section including means for fastening said support member to a supporting surface, each of said end sections having a recess therein facing the corresponding recess in said other end section, said hitching means including a hollow housing disposed between said recesses of said end sections, an opening in the sidewall of said housing, at least one bracket section extending outwardly from the external sidewall of said housing adjacent said opening thereof, a trigger member pivotally connected to said bracket section, said trigger member having a first portion extending through said sidewall opening of said housing, said first trigger portion having a rounded surface area extending toward the center of said housing and stop means adjacent the internal surface of said housing, said trigger member having a second portion extending generally along and spaced from said external sidewall of said housing, said biasing means being disposed within said housing and extending between said first portion of said trigger member and the end of said housing remote therefrom, whereby said second trigger portion end is urged toward said external sidewall of said housing.

2. A releasable animal hitching apparatus according to claim 1 wherein said housing is a cylindrical housing.

3. A releasable animal hitching apparatus according to claim 1 wherein said support member is a unitary U-shaped member.

4. A releasable animal hitching apparatus according to claim 1 wherein the recess in each of said end sections has an opening extending to the opposite face of said end section.

5. A releasable animal hitching apparatus according to claim 1 wherein said opening in said sidewall of said housing is located adjacent one end of said housing.

6. A releasable animal hitching apparatus according to claim 1 wherein a rod portion extends from the external sidewall of said housing adjacent the free end of said second portion of said trigger member.

7. A releasable animal hitching apparatus according to claim 1 wherein said trigger member is pivotally carried between a pair of parallel bracket sections extending from the external sidewall of said housing.

8. A releasable animal hitching apparatus according to claim 1 wherein said stop means of said first trigger portion is a substantially flat surface engageable with the internal sidewall of said housing.

9. A releasable animal hitching apparatus according to claim 1 wherein said biasing means includes a pivoting member urged against the recess in said end section which is remote from said first portion of said trigger member.

10. A releasable animal hitching apparatus according to claim 9 wherein said biasing means includes spheres disposed at the ends of a coil spring.

* * * * *